United States Patent
Wang et al.

(10) Patent No.: US 11,283,878 B2
(45) Date of Patent: Mar. 22, 2022

(54) DEVICE CONTROL METHOD, ELECTRONIC DEVICE AND STORAGE MEDIUM

(71) Applicant: BEIJING XIAOMI MOBILE SOFTWARE CO., LTD., Beijing (CN)

(72) Inventors: Yanjiong Wang, Beijing (CN); Zheng Li, Beijing (CN); Shan Chen, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/029,312

(22) Filed: Sep. 23, 2020

(65) Prior Publication Data

US 2021/0250406 A1 Aug. 12, 2021

(30) Foreign Application Priority Data

Feb. 7, 2020 (CN) .......................... 202010083056.3

(51) Int. Cl.
| | |
|---|---|
| H04L 29/08 | (2006.01) |
| H04L 67/125 | (2022.01) |
| H04W 4/021 | (2018.01) |
| H04W 8/00 | (2009.01) |

(52) U.S. Cl.
CPC .......... *H04L 67/125* (2013.01); *H04W 4/021* (2013.01); *H04W 8/005* (2013.01)

(58) Field of Classification Search
CPC ...... H04L 67/125; H04W 8/005; H04W 4/021
USPC ........................................................ 455/418
See application file for complete search history.

(56) References Cited

U.S. PATENT DOCUMENTS

| | | | |
|---|---|---|---|
| 10,970,997 B2* | 4/2021 | Arling | ................... G08C 23/04 |
| 2005/0225453 A1 | 10/2005 | Chang et al. | |
| 2011/0234366 A1 | 9/2011 | Feng et al. | |
| 2016/0358459 A1* | 12/2016 | Singhar | ................. G08C 17/02 |

(Continued)

FOREIGN PATENT DOCUMENTS

| | | | |
|---|---|---|---|
| CN | 103826007 A | * | 5/2014 |
| CN | 103826007 A | | 5/2014 |

(Continued)

OTHER PUBLICATIONS

Extended European Search Report dated Mar. 26, 2021 in corresponding European Patent Application No. 20200587.2, 7 pages.

(Continued)

*Primary Examiner* — Hirdepal Singh
(74) *Attorney, Agent, or Firm* — Oblon, McClelland, Maier & Neustadt, L.L.P.

(57) ABSTRACT

A device control method, an electronic device, and a storage medium are provided. The method can include establishing a first communication connection with at least one controlled device in response to a control device entering a control state, and acquiring a preset communication index corresponding to the first communication connection. The method can further include determining relative position information with respect to the at least one controlled device according to the preset communication index, and determining one of the controlled devices as a target device based on the relative position information, and controlling the target device.

20 Claims, 3 Drawing Sheets

(56) References Cited

U.S. PATENT DOCUMENTS

2017/0013112 A1    1/2017   Singhar et al.
2019/0380161 A1*  12/2019   Song ..................... H04W 8/005
2020/0068059 A1*   2/2020   Hwang ............... G06F 16/9537
2020/0196366 A1*   6/2020   Ahn ....................... H04M 11/00

FOREIGN PATENT DOCUMENTS

WO    WO 2010/064167 A2    6/2010
WO    WO 2016/192916 A1   12/2016

OTHER PUBLICATIONS

Combined Chinese Office Action and Search Report dated Jun. 3, 2021 in corresponding Chinese Patent Application No. 202010083056.3 (with English Translation), 22 pages.

* cited by examiner

DEVICE CONTROL METHOD, ELECTRONIC DEVICE AND STORAGE MEDIUM

CROSS-REFERENCE TO RELATED APPLICATIONS

This application claims priority to and benefits of Chinese Patent Application Serial No. 202010083056.3, filed on Feb. 7, 2020, the entire content of which is incorporated herein by reference.

TECHNICAL FIELD

The present disclosure relates to a field of communications technologies, including a device control method, an electronic device, and a storage medium.

BACKGROUND

With the development of intelligent hardware technologies, intelligent household devices are increasingly used in the home environment. In related technologies, for the convenience of a user, one control device, such as a controller, a smart phone, a tablet computer, and the like, can control a plurality of intelligent household devices. In the actual application process, the user can search for a target device to be controlled through the control device, thereby controlling the target device through the control device. However, when the number of intelligent household devices controlled by the control device is large, in actual use, the user needs to search for the target device to be controlled from multiple intelligent household devices each time. This process not only takes a long search time, but also is cumbersome in operation, which is not conducive to the user's experience.

SUMMARY

The present disclosure provides a device control method, an electronic device, and a storage medium.

According to a first aspect of the present disclosure, there is provided a device control method. The method can include establishing a first communication connection with at least one controlled device in response to a control device entering a control state, acquiring a preset communication index corresponding to the first communication connection, determining relative position information with respect to the at least one controlled device according to the preset communication index, determining one of the controlled devices as a target device based on the relative position information, and controlling the target device.

According to a second aspect of the present disclosure, there is provided an electronic device. The electronic device can include a processor and a memory for storing instructions executable by the processor. The processor is configured to establish a first communication connection with at least one controlled device in response to a control device entering a control state, acquire a preset communication index corresponding to the first communication connection, determine relative position information with respect to the at least one controlled device according to the preset communication index, determine one of the controlled devices as a target device based on the relative position information, and control the target device.

According to a third aspect of the present disclosure, there is provided a non-transitory computer-readable storage medium having stored therein a computer program that, when executed by a processor, causes the processor to perform steps of any one of methods as described above.

BRIEF DESCRIPTION OF THE DRAWINGS

The accompanying drawings, which are incorporated in and constitute a part of this specification, illustrate exemplary embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The terms used in the present disclosure are only for the purpose of describing specific embodiments, and are not intended to limit the present disclosure. The singular forms "a", "said" and "the" used in the present disclosure and appended claims are also intended to include plural forms, unless the context clearly indicates other meanings. It should also be understood that the term "and/or" used herein refers to and includes any or all possible combinations of one or more associated listed items.

It should be understood that although the terms "first", "second", "third", etc. may be used in this disclosure to describe various information, the information should not be limited to these terms. These terms are only used to distinguish the same type of information from each other. For example, without departing from the scope of the present disclosure, the first information may also be referred to as second information, and similarly, the second information may also be referred to as first information. Depending on the context, the word "if" as used herein can be interpreted as "upon" or "when" or "in response to determining".

Figure 1:
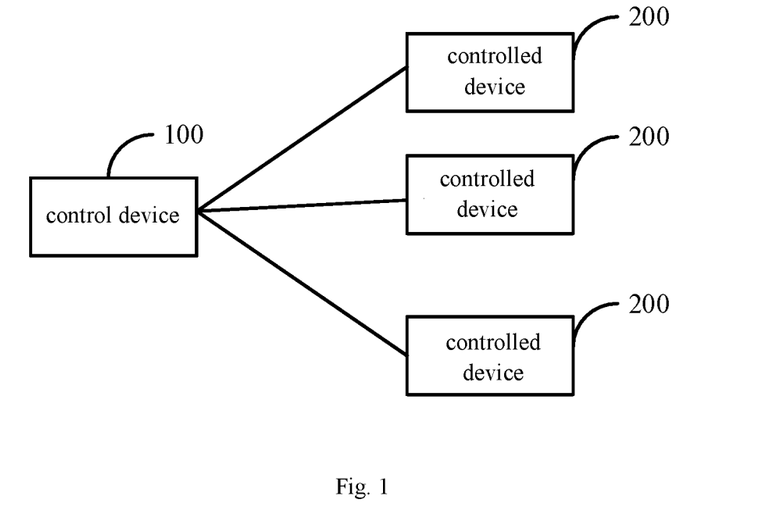
FIG. 1 is a schematic diagram showing an architecture of a control system according to an exemplary embodiment of the present disclosure.

Referring to FIG. 1, it is a schematic diagram showing an architecture of a control system according to an exemplary embodiment of the present disclosure. As shown in FIG. 1, the control system includes a control device 100 and a plurality of controlled devices 200. The control device 100 can control the plurality of controlled devices 200, such that a user may use the control system conveniently. The control device 100 includes, but is not limited to, an intelligent device such as a controller, a mobile phone, a tablet, or a computer. The controlled device 200 includes, but is not limited to, an intelligent household device (such as a TV, an air conditioner, a refrigerator, or a cleaning robot), a computer office device, a movable device (such as a balancing scooter), a toy device, a musical instrument, and the like.

Taking the problems of the related art into consideration, according to embodiments of the present disclosure, a device control method is provided. A control device can establish a first communication connection with at least one controlled device after entering a control state, acquire a preset communication index by the signal transmission via the first communication connection, determine relative position information between the control device and each controlled device according to the preset communication index, and determine one of the controlled devices as a target device according to the relative position information, such that the user can directly control the target device through the control device. According to the embodiments of the present disclosure, it is possible to realize the determination of the target device based on the relative spatial position relationship without manually determining the target device by the user, thus reducing the user's operation steps and improving the user's experience.

Figure 2:
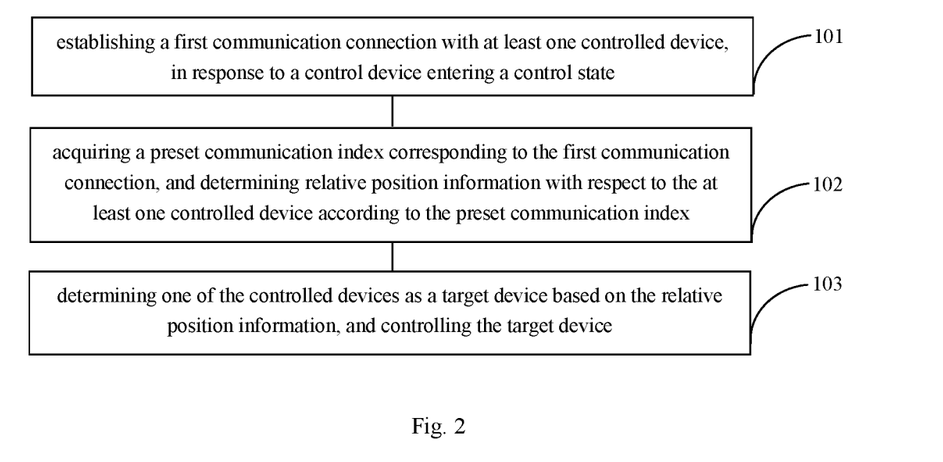
FIG. 2 is a flow chart showing a device control method according to an exemplary embodiment of the present disclosure.

Referring to FIG. 2, it is a flow chart of a device control method according to an exemplary embodiment of the present disclosure. The method can be applied to the control system shown in FIG. 1. The method may be performed by a control device and can include the following steps 101 to 103.

In step 101, a first communication connection with at least one controlled device is established, in response to a control device entering a control state.

In step 102, a preset communication index corresponding to the first communication connection is acquired, and relative position information with respect to the at least one controlled device is determined according to the preset communication index.

In step 103, one of the controlled devices is determined as a target device based on the relative position information, and the target device is controlled.

In an exemplary embodiment, the control device establishes a first communication connection with at least one controlled device in response to a control state after detecting that the control device itself enters the control state, thereby acquiring a preset communication index generated by the transmission of a communication signal via the first communication connection. Then, a relative position between the control device and each controlled device is determined according to the preset communication index, thereby determining a target device from all the controlled devices based on the relative position, and controlling the target device. In this embodiment, the process of determining the target device based on the spatially relative position relationship can be realized, such that the user does not need to manually determine the target device, which further facilitates the user's usage and improves the user's experience.

Of course, it should be understood that in the embodiments of the present disclosure, the conditions for the control device to enter the control state can be specifically set according to actual application scenarios without particular limitations. In one example, the control device determines that it enters the control state when it detects that the control device itself is picked up. As one implementation of the above example, the control device includes a sensor for measuring acceleration data, such as an acceleration sensor or an inertial measurement unit (IMU), and the control device can determine whether the control device itself is picked up through the acceleration data. In another example, a preset application program for controlling the controlled device is installed in the control device, and the user can control the controlled device through the preset application program. Specifically, when the control device detects that a preset application program installed in the control device is started, the control device determines that it enters the control state.

In a possible embodiment, the control device may send a parameter for establishing the first communication connection to the at least one controlled device through a second communication connection established with the at least one controlled device in advance, in response to the entered control state. The parameter includes at least a connection identifier, a key, a communications band, and the like. Thus, a connection between the control device and the controlled device can be established quickly and accurately based on the parameter for establishing the first communication connection, thereby further optimizing and determining the response speed of the target device.

In another possible embodiment, the control device may also directly establish the first communication connection with the at least one controlled device by means of broadcasting, and the like, in response to the control device entering the control state. There are no particular restrictions on this embodiment of the present disclosure.

In an embodiment, a first communication protocol used to establish the first communication connection is a short-range wireless communication protocol. The feature of this type of protocol is that there is no need to forward a communication signal through a relay device, and the communication signal can be directly transmitted between the control device and the controlled device by the first communication protocol to establish the first communication connection, which ensures that the relative position information between the control device and the controlled device can be determined according to the preset communication index corresponding to the first communication connection. Herein, the first communication protocol includes, but is not limited to, a WiFi protocol, a Bluetooth protocol or a UWB protocol.

Herein, the second communication connection is used to ensure basic data transmission between the control device and the controlled device. In an embodiment, a second communication protocol used to establish the second communication connection may be a short-range wireless communication protocol or a mobile communication protocol, or other communication protocols used for data transmission, which is not particularly limited in the embodiments of the present disclosure. The short-range wireless communication protocol includes, but is not limited to, an infrared protocol, a WiFi protocol, a Bluetooth protocol, a UWB protocol, or a ZigBee protocol. The mobile communication protocol includes any communication protocol, such as a 3G communication protocol, a 4G communication protocol, a GSM communication protocol, or a GPRS communication protocol.

In addition, for a new controlled device, the control device may not be able to determine which type of first communication protocol the new controlled device supports to establish the first communication connection. In this case, the control device may establish a second communication connection with the new controlled device through a second communication protocol in advance, and the first communication protocol supported by the controlled device is determined through the second communication connection.

Herein, the control device may determine the first communication protocol supported by the controlled device in the following way. The control device may send a protocol query request to the controlled device through the second communication connection, in which the protocol query request is configured to query the first communication protocol supported by the controlled device. After receiving the protocol query request, the controlled device generates a protocol query response based on the first communication protocol supported by itself in response to the protocol query request, and sends the protocol query response to the control device through the second communication connection. The protocol query response includes information about the first communication protocol supported by the controlled device. Thus, the control device can determine and record the first communication protocol supported by the controlled device based on the protocol query response.

Furthermore, in response to the control device entering the control state, it may establish a first communication connection with the at least one controlled device according to the pre-recorded first communication protocol supported by the at least one controlled device, such that a corresponding preset communication index can be acquired by the signal transmission via the first communication connection to realize the determination of the spatially relative position relationship between the devices based on the preset communication index.

In an embodiment, in response to the control device entering the control state, the control device may also send notification information to the controlled device through a pre-established second communication connection, in which the notification information is configured to notify the controlled device to enter a state to be controlled, such that the controlled device can adjust its own working state according to the notification information to enter a state to be controlled, thereby further improving response efficiency.

It should be understood that the signal transmission via the first communication connection between the control device and the controlled device may be established by the fact that the control device sends a communication signal to the controlled device, or the controlled device sends a communication signal to the control device, or the communication signal interacts between the control device and the controlled device. The specific settings of this embodiment can be made according to actual application scenarios without particular limitations.

In a possible embodiment, the control device may acquire the preset communication index generated during the communication signal transmission process of the first communication connection, and then the control device determines the relative position information with respect to the at least one controlled device according to the preset communication index, thereby determining one of the controlled devices as a target device based on the relative position information. In this embodiment, it is possible to realize the determination of the target device through the spatially relative position relationship between the devices, and thus the user does not need to manually determine the target device, thus further facilitating the user's usage and improving the user's experience.

In another possible embodiment, each controlled device may acquire the preset communication index generated during the communication signal transmission process of the first communication connection, determine the relative position information between itself and the control device according to the preset communication index, and send the relative position information to the control device, thereby determining by the control device one of the controlled devices as a target device based on the relative position information. In this embodiment, it is possible to realize that the target device is determined by the relative spatial position relationship between the devices, such that the user does not need to manually determine the target device, thus further facilitating the user's usage and improving the user's experience.

Those skilled in the art can understand that the specific selections of the preset communication index for determining the relative position information in the embodiments of the present disclosure can be made according to actual application scenarios without particular limitations.

In an example, the relative position information includes a relative angle between the control device and the controlled device, and the preset communication index includes at least a signal incident angle during a communication signal transmission process of the first communication connection. As one implementation of the above example, the control device includes a communication module that establishes the first communication connection. The communication module includes an antenna array, and the antenna array includes at least two antennas, i.e., two antennas, or three antennas, or even more. The antenna array is disposed at a top of the control device, in which the top can be understood as an end facing the controlled device when the control device controls the controlled device. Specifically, the antenna array is disposed at the top of the control device according to usage habits of users for the control device. The signal incident angle can be determined by the antenna array, such that the control device can determine the relative angle between the control device and the controlled device based on the signal incident angle and a preset direction finding and positioning algorithm. The distance between the antennas can be specifically set according to actual application scenarios. As an example, the distance range between the antennas can be set between one quarter and one half of their wavelength.

Those skilled in the art can understand that in the embodiments of the present disclosure, there are no particular restrictions on the direction finding and positioning algorithm, and it can be specifically selected according to actual application scenarios. For example, the direction finding and positioning algorithm may be an AoA (Angle of Arrival) direction finding algorithm.

In another example, the relative position information further includes a distance between the control device and the controlled device, and the preset communication index includes at least a signal strength, a signal transmission time, a signal arrival time, and the like, of the communication signal in the communication signal transmission via the first communication connection. As one implementation of the above example, the control device may determine the distance with respect to the controlled device based on the signal strength and a preset ranging and positioning algorithm. As another implementation of the above example, the control device may determine the distance from the controlled device based on the signal transmission time and a preset ranging and positioning algorithm.

Those skilled in the art can understand that in the embodiments of the present disclosure, there are no particular restrictions on the ranging and positioning algorithm, and it can be specifically selected according to actual application scenarios. For example, the ranging and positioning algorithm may be a ToF (Time of Flight) algorithm, which determines the distance between the control device and the controlled device based on the signal transmission time and the speed of light. Alternatively, the ranging and positioning algorithm may also be an RSS (Received Signal Strength) algorithm, which determines the distance between the control device and the controlled device based on the signal strength. Alternatively, the ranging and positioning algorithm may also be a TOA (time of arrival) algorithm, which determines the distance between the control device and the controlled device based on the signal arrival time.

In some application scenarios, considering that a control device usually faces towards a controlled device when a user controls the controlled device through the control device, the control device is pointed at the controlled device at this time. Therefore, in some embodiments, the control device may determine that a controlled device currently pointed towards by the control device is the target device based on the relative position information.

In an embodiment, when the control device is pointed towards the controlled device, it can be determined through the measurement result of the antenna array provided at the top of the control device that the relative angle between the control device and the controlled device is in a certain range. In this case, the relative position information includes the relative angle between the control device and the controlled device, and the step of determining one of the controlled devices as the target device includes determining a controlled device at a relative angle to the control device in a preset range as the target device from the at least one controlled device. In this embodiment, it is possible to realize the determination of the target device based on the relative spatial position relationship between the devices, and thus the user does not need to manually determine the target device, thereby improving the user experience. Further, since the antenna array is disposed at the top of the control device, it is possible to ensure the accuracy of the measured relative angle between the control device and the controlled device. It should be understood that in this embodiment, there are no particular limitations on the preset range, and it can be specifically set according to actual application scenarios, for example, the preset range is in a range of 0° to 10°.

In another embodiment, when the user controls the controlled device through the control device, the control device is pointed towards the controlled device, and usually the distance between the control device and the controlled device is not too far. Therefore, in order to further improve the accuracy of determining the target device, the relative position information includes a distance between the control device and the controlled device, and a relative angle between the control device and the controlled device. The step of determining one of the controlled devices as the target device includes determining a controlled device at a distance from the control device less than a preset threshold and at a relative angle to the control device within a preset range in the at least one controlled device as the target device. In this embodiment, it is possible to realize the determination of the target device based on the relative spatial position relationship between the devices, and thus the user does not need to manually determine the target device, which facilitates the user's usage and improves the user experience. Further, the target device is determined by the distance and the relative angle between the control device and the controlled device, thereby ensuring the accuracy of the determination results. It can be understood that the preset threshold in this embodiment can be specifically set according to actual application scenarios without particular limitations.

Figure 3A:
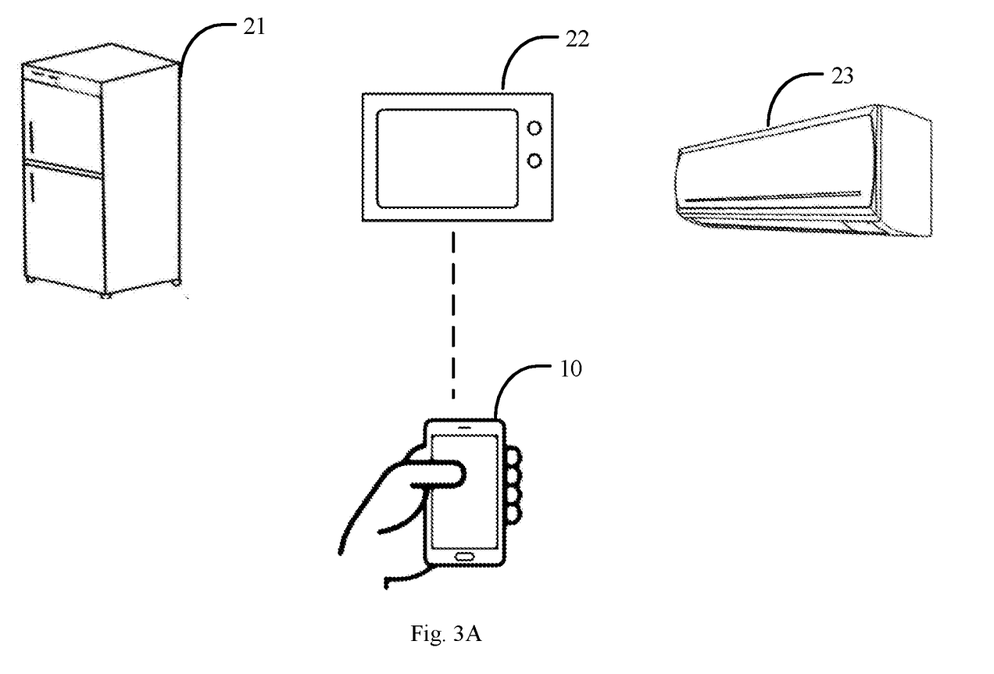
FIG. 3A is a schematic diagram showing an application scenario according to an exemplary embodiment of the present disclosure.

Referring to FIG. 3A, in an exemplary application scenario, the control device 100 includes a mobile phone 10, and the controlled device 200 includes a refrigerator 21, a television 22, and an air conditioner 23. The mobile phone 10 can control the refrigerator 21, the television 22, and the air conditioner 23. In this application scenario, the user holds the mobile phone 10 and points it towards the television 22 for the control of the television 22. In response to the mobile phone 10 entering a control state, a first communication connection is established with the refrigerator 21, the television 22, and the air conditioner 23, respectively. The mobile phone 10 acquires a preset communication index generated in the communication signal transmission via the first communication connection with the refrigerator 21, and determines relative position information (i.e. a distance and a relative angle between the mobile phone 10 and the refrigerator 21) with respect to the refrigerator 21 based on the preset communication index. The mobile phone 10 acquires a preset communication index generated in the communication signal transmission via the first communication connection with the television 22, and determines relative position information (i.e. a distance and a relative angle between the mobile phone 10 and the television 22) with respect to the television 22 based on the preset communication index. The mobile phone 10 acquires a preset communication index generated in the communication signal transmission via the first communication connection with the air conditioner 23, and determines relative position information (i.e. a distance and a relative angle between the mobile phone 10 and the air conditioner 23) with respect to the air conditioner 23 based on the preset communication index. Then, the mobile phone 10 determines a controlled device at a distance from itself less than a preset threshold and at a relative angle to itself within a preset range in the at least one controlled device as a target device based on the above three pieces of relative position information, i.e., the mobile phone 10 determines a controlled device at a distance from itself less than a preset threshold and at a relative angle to itself within a preset range in the at least one controlled device as the controlled device towards which the mobile phone 10 is pointed. In the application scenario shown in FIG. 3A, the user holds the mobile phone 10 and points it towards the television 22, and the mobile phone 10 can judge that the television 22 pointed towards by the mobile phone 10 is the target device based on the above determination of the target device, such that the user can control the television 22 through the mobile phone 10. In this embodiment, it is possible to determine the target device based on the relative spatial position relationship between the devices, such that the user does not need to manually determine the target device, thus further facilitating the user's usage and improving the user's experience.

Figure 3B:
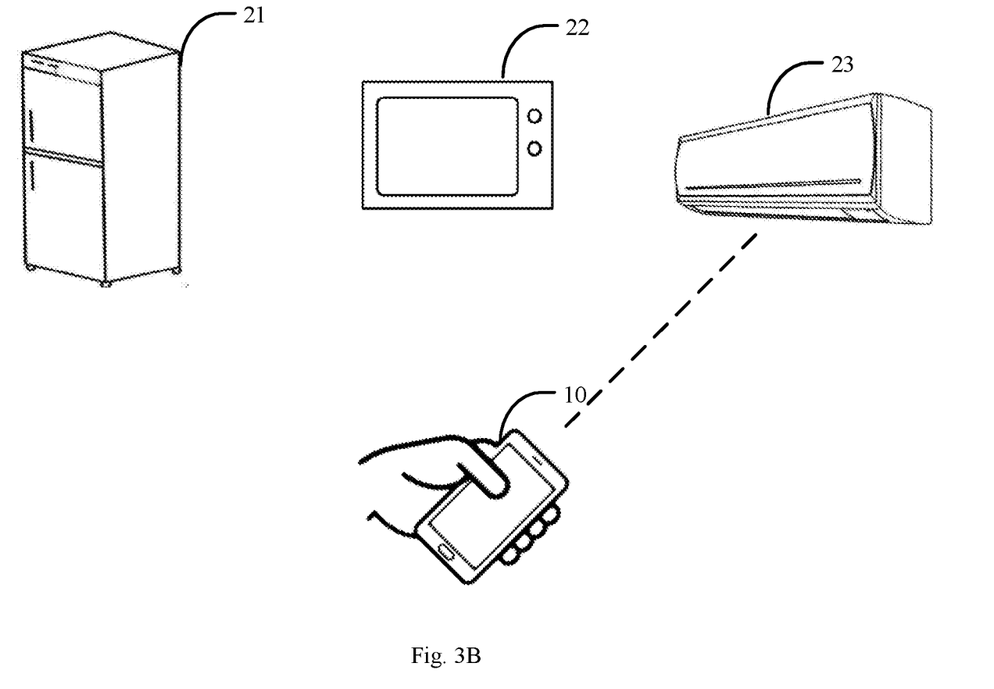
FIG. 3B is a schematic diagram showing another application scenario according to an exemplary embodiment of the present disclosure.

Referring to FIG. 3B, in another exemplary application scenario, the control device 100 includes a mobile phone 10, and the controlled device 200 includes a refrigerator 21, a television 22, and an air conditioner 23. The mobile phone 10 can control the refrigerator 21, the television 22, and the air conditioner 23. In this application scenario, the user holds the mobile phone 10 and points it to the air conditioner 23 to control the air conditioner 23. The mobile phone 10 determines relative position information with respect to the refrigerator 21, the television 22, and the air conditioner 23, thereby determining a target device from the refrigerator 21, the television 22, and the air conditioner 23 based on the relative position information. In the application scenario shown in FIG. 3B, the mobile phone 10 can judge that the air conditioner 23 pointed to by the mobile phone 10 is the target device based on the above determination of the target device, such that the user can control the air conditioner 23 through the mobile phone 10. In this embodiment, it is possible to determine the target device based on the relative spatial position relationship between the devices, such that the user does not need to manually determine the target device, thus further facilitating the user's usage and improving the user's experience.

Further, after the target device is determined, the control device may display an interface for controlling the target device on a display interface of the control device, such that the user can perform an operation according to the interface for controlling the target device. The control device detects a user instruction directed by the operation, generates a control signal according to the detected user instruction, and sends the control signal to the target device, such that the target device can execute the control signal to achieve the control purpose. In the disclosed embodiments, since the interface for controlling the target device may be displayed on the display interface of the control device after the target device is determined, the user may use the control device conveniently, thereby improving the user experience.

Herein, the information displayed on the interface for controlling the target device includes, but is not limited to, a display icon of the target device, device information related to the target device, a control widget, etc. The user can perform a trigger operation on the control widget, and the control device detects a user instruction directed by the trigger operation.

As one implementation, the control device may send the control signal to the target device through the first communication connection to ensure accurate transmission of the control signal.

As another implementation, after the target device is determined, the control device may also send the control signal to the target device through the second communication connection. In an embodiment, a second communication protocol with low power consumption is selected to establish the second communication connection, such that the power consumption of using the second communication connection for data transmission is less than that of using the first communication connection for data transmission, while ensuring the accurate transmission of the control signal. For example, the first communication connection is established based on a UWB protocol, and the second communication connection can be established based on a WiFi protocol or a Bluetooth protocol with lower power consumption than the UWB protocol, thereby reducing the power consumption of the devices. It should be understood that the specific transmission process of the control signal in the second communication connection in the embodiments of the present can be made according to actual application scenarios without particular limitations. For example, in transmitting the control signal through the second communication connection, the control signal may be transmitted through an intermediate device (such as a router or server, etc.).

In another embodiment, after the target device is determined, in order to further facilitate the user's usage, the user can control the target device by voice, and the control device can collect and recognize the user's voice signal to obtain a recognition content, generate a control signal according to the recognition content, and send the control signal to the target device through the second communication connection. In this embodiment, it is possible to implement voice control of the target device, which further reduces the user's operation steps and improves the user's experience.

In the embodiments of the present disclosure, a first communication connection is established with at least one controlled device in response to a control device entering a control state, a preset communication index corresponding to the first communication connection is acquired, relative position information with respect to the at least one controlled device is determined according to the preset communication index, one of the controlled devices is determined as a target device based on the relative position information, and the target device is controlled. In the embodiment of the present disclosure, it is possible to determine the target device by a relative spatial position relationship between the devices, such that the user does not need to manually determine the target device, thus reducing the user's operation steps, facilitating the user's usage, and improving the user's experience.

The various technical features in the above embodiments can be combined arbitrarily, as long as there is no conflict or contradiction between the combinations of features. Due to space limitations, the combinations of features are not described one by one. Therefore, the various technical features in the above embodiments combined arbitrarily also belongs to the scope of the present disclosure.

Corresponding to the device control method in the above-mentioned embodiments, an infusion monitoring device, an apparatus to which the device is applied, and a storage medium are also provided in embodiments of the present disclosure.

Figure 4:
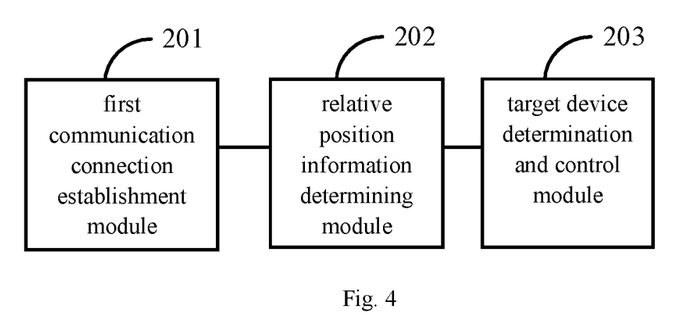
FIG. 4 is a block diagram showing a device control apparatus according to an exemplary embodiment of the present disclosure.

Referring to FIG. 4, it is a block diagram showing a device control apparatus according to an exemplary embodiment of the present disclosure. The apparatus includes a first communication connection establishment module 201, a relative position information determining module 202 and a target device determination and control module 203. Of course, it should be understood that one or more of the modules described in this specification can be implemented, for example, in processing circuitry.

The first communication connection establishment module 201 is configured to establish a first communication connection with at least one controlled device in response to a control device entering a control state.

The relative position information determining module 202 is configured to acquire a preset communication index corresponding to the first communication connection, and determine relative position information with respect to the at least one controlled device according to the preset communication index.

The target device determination and control module 203 is configured to determine one of the controlled devices as a target device based on the relative position information, and control the target device.

In the embodiments of the present disclosure, a first communication connection is established with at least one controlled device in response to a control device entering a control state, a preset communication index corresponding to the first communication connection is acquired, relative position information with respect to the at least one controlled device is determined according to the preset communication index, one of the controlled devices is determined as a target device based on the relative position information, and the target device is controlled. In the embodiments of the present disclosure, it is possible to determine a target device based on a relative spatial position relationship between the devices, and thus the user does not need to manually determine the target device, thus reducing the user's operation steps, facilitating the user's usage, and improving the user's experience.

In one embodiment, the relative position information with respect to the at least one controlled device includes a distance from and a relative angle to the controlled device.

The target device determination and control module 203 includes a target device determining unit and a target device control unit. The target device determining unit is configured to determine a controlled device at a distance from the control device less than a preset threshold and at a relative angle to the control device within a preset range in the at least one controlled device as the target device. The target device control unit is configured to control the target device.

In one embodiment, the preset communication index includes a signal strength or a signal transmission time for determining the distance.

In another embodiment, the control device includes a communication module for establishing the first communication connection. The communication module includes an antenna array. The antenna array includes at least two antennas and is disposed at a top of the control device.

The preset communication index includes a signal incident angle determined by the antenna array. The signal incident angle is configured to determine the relative angle.

In a further embodiment, before the first communication connection establishment module 201, the apparatus further includes a parameter transmission module. The parameter transmission module is configured to send a parameter for establishing the first communication connection to the at least one controlled device through a second communication connection established with the at least one controlled device in advance. The parameter includes at least a connection identifier, a key, or a communications band.

In one embodiment, the target device determination and control module 203 includes a target device determining unit and a target device control unit. The target device determining unit is configured to determine one of the controlled devices as the target device based on the relative position information. The target device control unit is configured to generate a control signal according to a detected instruction, and send the control signal to the target device through the second communication connection.

In one embodiment, a trigger condition for entering the control state includes any one or more of detecting that the control device is picked up, or a preset application program installed in the control device is started.

In another embodiment, the target device determination and control module 203 is configured to determine one of the controlled devices as the target device based on the relative position information, display an interface for controlling the target device on a display interface of the control device, and control the target device by the interface for controlling the target device.

In one embodiment, the target device determination and control module 203 includes a target device determining unit and a target device control unit. The target device determining unit is configured to determine one of the controlled devices as the target device based on the relative position information. The target device control unit is configured to collect and recognize a voice signal to obtain a recognition content, generate a control signal according to the recognition content, and send the control signal to the target device through the second communication connection.

In one embodiment, a first communication protocol for establishing the first communication connection includes any one of a WiFi protocol, a Bluetooth protocol or a UWB protocol. A second communication protocol for establishing the second communication connection includes any one of a short-range wireless communication protocol or a mobile communication protocol. The short-range wireless communication protocol includes at least any of an infrared protocol, a WiFi protocol, a Bluetooth protocol, a UWB protocol, or a ZigBee protocol. The mobile communication protocol can include any communication protocol, such as a 3G communication protocol, a 4G communication protocol, a GSM communication protocol, or a GPRS communication protocol.

For the implementation process of the functions and roles of each module in the above-mentioned apparatus, reference is made to the implementation process of the corresponding steps in the above-mentioned method for details, which will not be repeated here.

For the apparatus embodiment, since it basically corresponds to the method embodiment, the relevant part can refer to the part of the description of the method embodiment. The apparatus embodiments described above are merely illustrative. The units described as separate components may or may not be physically separated, and the components displayed as units may or may not be physical units, that is, they may be located in one place, or can be distributed to multiple network units. Some or all of the modules can be selected according to actual needs to achieve the objectives of the solutions of the present disclosure. Those of ordinary skill in the art can understand and implement the solutions of the present disclosure.

Correspondingly, an electronic device is also provided in embodiments of the present disclosure. The electronic device includes a processor and a memory for storing instructions executable by the processor. The processor is configured to establish a first communication connection with at least one controlled device in response to a control device entering a control state, acquire a preset communication index corresponding to the first communication connection, determine relative position information with respect to the at least one controlled device according to the preset communication index, determine one of the controlled devices as a target device based on the relative position information, and control the target device.

Correspondingly, a non-transitory computer-readable storage medium is also provided in embodiments of the present disclosure. The storage medium has stored therein a computer program that, when executed by a processor, causes the processor to perform steps of any one of above-mentioned methods In embodiments of the present disclosure, a computer program product implemented on one or more storage media including, but not limited to, disk storages, CD-ROMs, optical storages, and the like containing program codes is used. The computer-readable storage medium includes permanent and non-permanent, removable and non-removable media, and information storage can be realized by any method or technology. The information can be computer-readable instructions, data structures, program modules, or other data. The computer-readable storage medium includes, but is not limited to, a phase-change random access memory (PRAM), a static random access memory (SRAM), a dynamic random access memory (DRAM), other types of random access memories (RAMs); a read-only memory (ROM), an electrically erasable programmable read-only memory (EEPROM), a flash memory or memories by other technologies, a compact disc-read only memory (CD-ROM); a digital versatile disc (DVD) or other optical storages; or a cassette tape, a magnetic tape, a magnetic disk storage or other magnetic storage devices or any other non-transmission media, which can be configured to store information accessed by computing devices.

Figure 5:
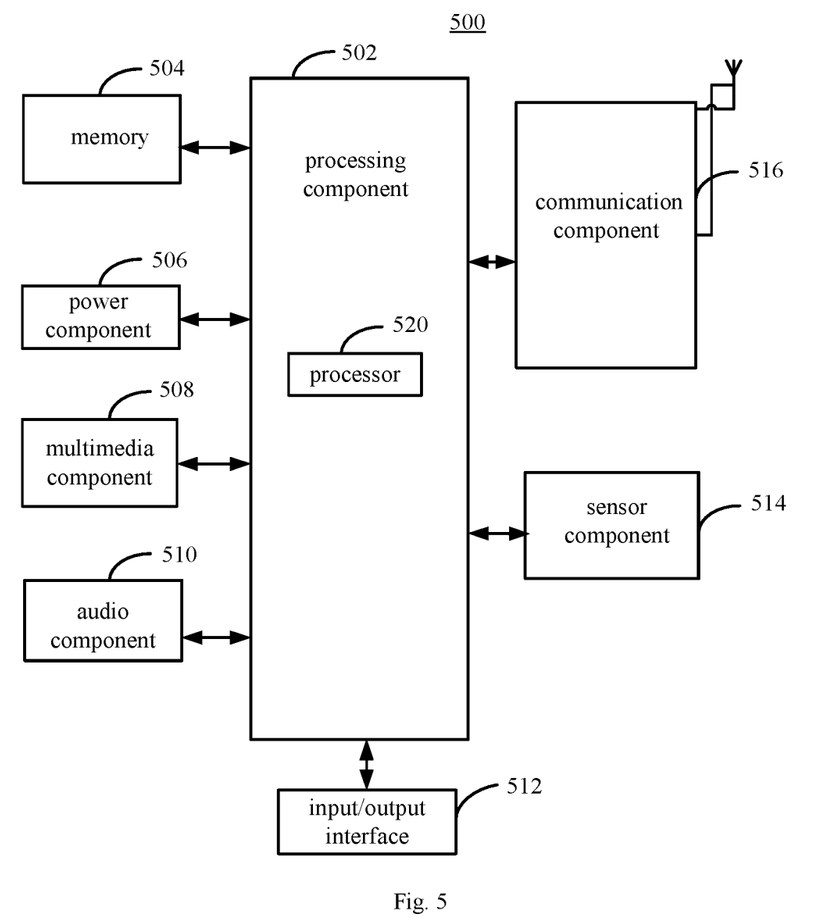
FIG. 5 is a block diagram showing a control device according to an exemplary embodiment of the present disclosure.

As shown in FIG. 5, it is a block diagram of a control device according to an exemplary embodiment of the present disclosure. The device 500 may be a controller, such as a smart phone, a tablet device, a computer or a personal digital assistant.

Referring to FIG. 5, the device 500 may include one or more of the following components: a processing component 502, a memory 504, a power component 506, a multimedia component 508, an audio component 510, an input/output (I/O) interface 512, a sensor component 514, and a communication component 516.

The processing component 502 generally controls the overall operations of the device 500, such as operations associated with display, telephone calls, data communications, camera operations, and recording operations. The processing component 502 may include one or more processors 520 to execute instructions to perform all or part of the steps of the above described method. In addition, the processing component 502 may include one or more modules to facilitate the interaction between the processing component 502 and other components. For example, the processing component 502 may include a multimedia module to facilitate the interaction between the multimedia component 508 and the processing component 502.

The memory 504 is configured to store various types of data to support operations in the device 500. Those data include instructions for any application or method operating on the device 500, contact data, phonebook data, messages, pictures, videos, etc. The memory 504 can be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 506 provides power to various components of the device 500. The power component 506 may include a power management system, one or more power sources, and other components associated with the generation, management, and distribution of power in the device 500.

The multimedia component 508 includes a screen that provides an output interface between the device 500 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of a touch or slide action, but also detect the duration and pressure related to the touch or slide action. In some embodiments, the multimedia component 508 includes a front camera and/or a rear camera. When the device 500 is in an operation mode, such as a shooting mode or a video mode, the front camera and/or the rear camera can receive external multimedia data. Each of the front camera and the rear camera can be a fixed optical lens system or have focal length and optical zoom capabilities.

The audio component 510 is configured to output and/or input audio signals. For example, the audio component 510 includes a microphone (MIC). When the device 500 is in an operation mode, such as a call mode, a recording mode, and a voice recognition mode, the microphone is configured to receive external audio signals. The received audio signals may be further stored in the memory 504 or transmitted via the communication component 516. In some embodiments, the audio component 510 further includes a speaker for outputting audio signals.

The I/O interface 512 provides an interface between the processing component 502 and a peripheral interface module. The peripheral interface module may be a keyboard, a click wheel, a button, etc. These buttons may include, but are not limited to, a home button, a volume button, a start button, and a lock button.

The sensor component 514 includes one or more sensors for providing the device 500 with status assessment in various aspects. For example, the sensor component 514 can detect the on/off status of the device 500 and the relative positioning of components, e.g., a display and a keypad of the device 500. The sensor component 514 can also detect the position change of the device 500 or a component of the device 500, the presence or absence of contact between the user and the device 500, the orientation or acceleration/deceleration of the device 500, and the temperature change of the device 500. The sensor component 514 may include a proximity sensor configured to detect the presence of nearby objects without physical contact. The sensor component 514 may also include a light sensor, such as a CMOS or CCD image sensor, for imaging applications. In some embodiments, the sensor component 514 may also include an acceleration sensor, a gyroscope sensor, a magnetic sensor, a pressure sensor or a temperature sensor.

The communication component 516 is configured to facilitate wired or wireless communication between the device 500 and other devices. The device 500 can access a wireless network based on any communication standard, such as WiFi, 2G or 3G or a combination thereof. In an exemplary embodiment, the communication component 516 receives a broadcast signal or broadcast related information from an external broadcast management system via a broadcast channel. In an exemplary embodiment, the communication component 516 further includes a near field communication (NFC) module to facilitate short-range communication. For example, the NFC module can be implemented based on a radio frequency identification (RFID) technology, an infrared data association (IrDA) technology, an ultra-wideband (UWB) technology, a Bluetooth (BT) technology and other technologies.

In an exemplary embodiment, the device 500 may be implemented by one or more application specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic components, which are configured to perform the above methods.

In an exemplary embodiment, a non-transitory computer-readable storage medium having stored therein instructions is also provided, such as a memory 504 including instructions, which may be executed by the processor 520 of the device 500 to perform the above method. For example, the non-transitory computer-readable storage medium may be a read-only memory (ROM), a random access memory (RAM), a compact disc read-only memory (CD-ROM), a magnetic tape, a floppy disk, an optical data storage device, etc.

In an embodiment, when the instructions in the storage medium are executed by the processor, the device 500 performs a device control method. The device control method includes establishing a first communication connection with at least one controlled device in response to a control device entering a control state, acquiring a preset communication index corresponding to the first communication connection, determining relative position information with respect to the at least one controlled device according to the preset communication index, determining one of the controlled devices as a target device based on the relative position information, and controlling the target device.

Those skilled in the art will easily think of other embodiments of the present disclosure after considering the specification and practicing the present disclosure disclosed herein. The present disclosure is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and the embodiments are to be regarded as being exemplary only, and the true scope and spirit of the present disclosure are specified by the following claims.

It will be appreciated that the present disclosure is not limited to the exact construction that has been described above and illustrated in the accompanying drawings, and that various modifications and changes can be made without departing from the scope thereof. It is intended that the scope of the present disclosure shall only be limited by the appended claims.

The above are only the embodiments of the present disclosure and are not used to limit the present disclosure. Any modification, equivalent replacement, improvement, etc. made within the spirit and principle of the present disclosure may be included in the protection scope of the present disclosure.

What is claimed is:

1. A device control method for a control device that is capable of establishing a first communication connection with at least one controlled device according to a first communication protocol and establishing a second communication connection with the at least one controlled device according to a second communication protocol-, the method comprising:
    establishing the second communication connection with the at least one controlled device when the control device enters a control state;
    sending, by the control device, a parameter for establishing the first communication connection to the at least one controlled device through the second communication connection;
    establishing the first communication connection with the at least one controlled device according to the parameter;
    acquiring a preset communication index corresponding to the first communication connection and determining, by the control device, relative position information with respect to the at least one controlled device based on the preset communication index; and
    determining one of the at least one controlled device as a target device based on the relative position information and controlling the target device,
    wherein a power consumption of the second communication connection is less than that of the first communication connection.

2. The method according to claim 1, wherein
    the determining the one of the at least one controlled device as the target device based on the relative position information further comprises:
        determining a controlled device of the at least one controlled device as the target device when a distance between the controlled device and the control device indicated in the relative position information is less than a preset threshold and a relative angle of the controlled device to the control device indicated in the relative position information is within a preset range.

3. The method according to claim 2, wherein the preset communication index comprises a signal strength or a signal transmission time for determining the distance.

4. The method according to claim 2, wherein
    the control device comprises a communication module that is configured to establish the first communication connection, the communication module including an antenna array that is disposed at a top of the control device and has at least two antennas, and
    the preset communication index comprises a signal incident angle determined by the antenna array for determining the relative angle.

5. The method according to claim 1, wherein
    the parameter includes at least a connection identifier, a key, or a communications band.

6. The method according to claim 1, wherein the controlling the target device comprises:
    generating a control signal according to a detected instruction and sending the control signal to the target device through the second communication connection.

7. The method according to claim 1, wherein a trigger condition for entering the control state comprises at least one of:
    detecting that the control device is picked up, or
    starting a preset application program that is installed in the control device.

8. The method according to claim 1, further comprising, after the one of the at least one controlled device is determined as the target device based on the relative position information:
    displaying an interface for controlling the target device on a display interface of the control device.

9. The method according to claim 1, wherein the controlling the target device comprises:
    collecting and recognizing a voice signal to obtain a recognition content; and
    generating a control signal based on the recognition content and sending the control signal to the target device through the second communication connection.

10. The method according to claim 1, wherein
    the first communication protocol for establishing the first communication connection comprises any one of a WiFi protocol, a Bluetooth protocol, or a UWB protocol,
    the second communication protocol for establishing the second communication connection comprises any one of a short-range wireless communication protocol or a mobile communication protocol,
    the short-range wireless communication protocol comprises at least any of an infrared protocol, a WiFi protocol, a Bluetooth protocol, a UWB protocol, or a ZigBee protocol, and
    the mobile communication protocol comprises at least any of a 3G communication protocol, a 4G communication protocol, a GSM communication protocol, or a GPRS communication protocol.

11. An electronic device that is capable of establishing a first communication connection with at least one controlled device according to a first communication protocol and establishing a second communication connection with the at least one controlled device according to a second communication protocol, the electronic device comprising:
- a processor; and
- a memory for storing instructions executable by the processor,
- wherein the processor is configured to:
    - establish the second communication connection with the at least one controlled device when the electronic device enters a control state;
    - send a parameter for establishing the first communication connection to the at least one controlled device through the second communication connection;
    - establish the first communication connection with the at least one controlled device according to the parameter;
    - acquire a preset communication index corresponding to the first communication connection and determine relative position information with respect to the at least one controlled device based on the preset communication index; and
    - determine one of the at least one controlled device as a target device based on the relative position information and control the target device,
- wherein a power consumption of the second communication connection is less than that of the first communication connection.

12. The electronic device according to claim 11, wherein the processor is configured to determine a controlled device of the at least one controlled device as the target device when a distance between the controlled device and the electronic device indicated in the relative position information is less than a preset threshold and a relative angle of the controlled device to the electronic device indicated in the relative position information is within a preset range.

13. The electronic device according to claim 12, wherein the preset communication index comprises a signal strength or a signal transmission time for determining the distance.

14. The electronic device according to claim 12, further comprising:
- a communication module that is configured to establish the first communication connection, the communication module including an antenna array that is disposed at a top of the electronic device and has at least two antennas,
- wherein the preset communication index comprises a signal incident angle determined by the antenna array for determining the relative angle.

15. The electronic device according to claim 11, wherein, the parameter includes at least a connection identifier, a key, or a communications band, and
the processor is configured to control the target device by:
- generating a control signal according to a detected instruction, and
- sending the control signal to the target device through the second communication connection.

16. The electronic device according to claim 11, wherein a trigger condition for entering the control state comprises any one or more of:
- detecting that the electronic device is picked up, or
- starting a preset application program installed in the electronic device.

17. The electronic device according to claim 11, wherein, after the one of the controlled device is determined as the target device based on the relative position information, the processor is further configured to:
- display an interface for controlling the target device on a display interface of the electronic device.

18. The electronic device according to claim 11, wherein the processor is configured to control the target device by:
- collecting and recognizing a voice signal to obtain a recognition content; and
- generating a control signal based on the recognition content and sending the control signal to the target device through the second communication connection.

19. The electronic device according to claim 11, wherein
- the first communication protocol for establishing the first communication connection comprises any one of a WiFi protocol, a Bluetooth protocol, or a UWB protocol,
- the second communication protocol for establishing the second communication connection comprises any one of a short-range wireless communication protocol or a mobile communication protocol,
- the short-range wireless communication protocol comprises at least any of an infrared protocol, a WiFi protocol, a Bluetooth protocol, a UWB protocol, or a ZigBee protocol, and
- the mobile communication protocol comprises at least any of a 3G communication protocol, a 4G communication protocol, a GSM communication protocol, or a GPRS communication protocol.

20. A non-transitory computer-readable storage medium having stored therein a computer program that, when executed by a processor of a control device that is capable of establishing a first communication connection with at least one controlled device according to a first communication protocol and establishing a second communication connection with the at least one controlled device according to a second communication protocol, causes the control device to:
- establish the second communication connection with the at least one controlled device when the control device enters a control state;
- send a parameter for establishing the first communication connection to the at least one controlled device through the second communication connection;
- establish the first communication connection with the at least one controlled device according to the parameter;
- acquire a preset communication index corresponding to the first communication connection and determine relative position information with respect to the at least one controlled device based on the preset communication index; and
- determine one of the at least one controlled device as a target device based on the relative position information and control the target device,
- wherein a power consumption of the second communication connection is less than that of the first communication connection.

* * * * *